(12) United States Patent
Siraky

(10) Patent No.: US 8,203,717 B2
(45) Date of Patent: Jun. 19, 2012

(54) ROTATIONAL SPEED SENSOR

(75) Inventor: Josef Siraky, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 221 days.

(21) Appl. No.: 12/776,768

(22) Filed: May 10, 2010

(65) Prior Publication Data

US 2010/0296101 A1     Nov. 25, 2010

(30) Foreign Application Priority Data

May 25, 2009 (EP) .................................... 09161019

(51) Int. Cl.
*G01C 19/72* (2006.01)
(52) U.S. Cl. ...................................... 356/460
(58) Field of Classification Search .................. 356/460, 356/495
See application file for complete search history.

(56) References Cited

U.S. PATENT DOCUMENTS

| | | | | |
|---|---|---|---|---|
| 3,512,890 A | * | 5/1970 | McLaughlin | 356/470 |
| 5,044,749 A | * | 9/1991 | Califano | 356/460 |
| 2009/0059238 A1 | * | 3/2009 | Terrel et al. | 356/465 |

FOREIGN PATENT DOCUMENTS

| | | |
|---|---|---|
| EP | 0 007 827 A1 | 2/1980 |
| EP | 0 112 143 A1 | 6/1984 |
| EP | 0 259 509 A1 | 3/1988 |

OTHER PUBLICATIONS

European Search Report from European Patent Application No. 09161019.6.

* cited by examiner

*Primary Examiner* — Tarifur Chowdhury
*Assistant Examiner* — Jonathon Cook
(74) *Attorney, Agent, or Firm* — The Nath Law Group; Jerald L. Meyer; Gregory G. Bennett

(57) ABSTRACT

The invention relates to a sensor for the determination of the rotational speed of a shaft. To provide a sensor improved with respect to known tachometers, it is proposed that the sensor has a stationary part (20) and a part (22) co-rotating with the shaft (16), wherein the stationary part (20) has a laser light source (24), a first optical coupler (26), an optical detector (28) and an evaluation unit (30) which determines the rotational speed from the detector signals and the rotating part (22) has a light guide coil (32) which is rotationally fixedly connected to the shaft (16) and is wound concentrically to the shaft (16) and the ends (34 and 36) of the light guide coil (32) are guided to an end face so that, on the one hand, the light (40) of the light source (24) can be coupled into both ends (34 and 36) and two light components run around in opposite directions in the light guide coil (32) and, on the other hand, the light components can be decoupled from the two ends (34 and 36) for the superimposition of the light components on the detector (28) so that, on a rotation of the shaft (16), the detector signals can be detected while exploiting the Sagnac effect from the phase shift, dependent on the rotational speed, of the two light components running around in opposite directions.

14 Claims, 3 Drawing Sheets

ROTATIONAL SPEED SENSOR

Figure 1:
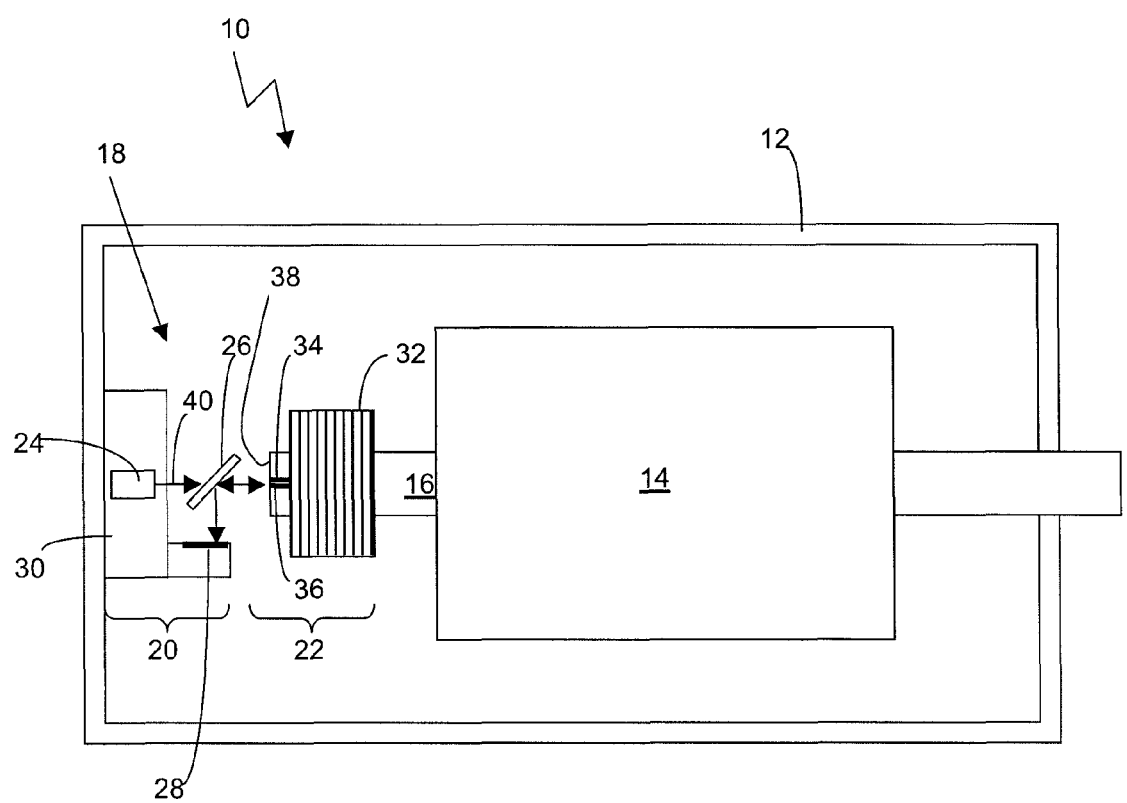

The invention relates to a sensor for the determination of the rotational speed of a shaft.

The regulation of the rotational speed of electric motors is as a rule carried out using a tachometer in the servo loop for the operation of the electric motor. Such tachometers, also called revolution counters, were in the past brush-type generators whose output voltage is proportional to the rotational speed. When digital rotation regulation was introduced, the determination of the rotational speed was carried out via the derivation of the position over time. Such digital revolution counters use the relative position of the shaft as the starting parameter, with the resolution being very high. The derivation of the position within a control clock pulse, which is at approximately 32 μs in the meantime today, requires ever more precise position encodes. Today, the total resolution per revolution therefore amounts to up to 24 bits, that is approximately 16 million divisions per rotation.

It is disadvantageous in this that the rotational speed is no longer measured directly, but is rather determined by conversion via the derivation of the position. Ever higher resolutions are therefore required which in turn make very high position frequencies necessary which can no longer be used in practice.

Starting from this prior art, it is the object of the invention to provide an improved sensor for the determination of the rotational speed of a shaft with which the aforesaid disadvantages can be avoided and which thus allows where possible a direct measurement of the rotational speed, and indeed with high precision, and which can simultaneously compete in cost with the previous systems.

The object is satisfied by a sensor having the features of claim 1.

The sensor in accordance with the invention for the determination of the rotational speed of a shaft has a stationary part and a part co-rotating with the shaft. The stationary part includes a laser light source, a first optical coupler, an optical detector and a evaluation unit which determines the rotational speed from the detector signals. The co-rotating part has a light guide coil which is rotationally fixedly connected to the shaft and is wound concentrically to the shaft. The light of the laser light source is coupled in a suitable manner into the two ends of the light guide coil so that two light components run around in opposite directions in the light guide coil. On a rotation of the shaft and thus of the light guide coil, a phase shift occurs between the two light components due to the Sagnac effect. The two light components can be decoupled from the end of the light guide coil for superimposition on the detector. Due to the phase shift in dependence on the rotational speed, interference dependent on the rotational speed occurs at the detector so that the rotational speed can be determined using the detector signals in the evaluation unit.

The substantial advantages of the sensor in accordance with the invention comprise the fact that the rotational speed is present directly as s starting parameter and the sensor has no moving parts and is therefore absolutely free of wear so that it is particularly suitable for use in servo motors. The rotating speed is measured directly in a contactless manner. Extremely short reaction times result. The resolution, measurement precision and service life are very high. The sensor has a low weight and can be designed in a compact manner. Furthermore, the sensor can compete in price with the existing rotational speed sensors, with the quality of the rotational speed signal furthermore being improved by a multiple. The sensitivity of the sensor in accordance with the invention can furthermore be scaled via the light guide coil size, that is via the light guide length and also via the wavelength.

The light of the laser light source can advantageously be coupled into or out of the light guide coil by means of a second coupler. Such a coupling in and out is generally already known from U.S. Pat. No. 5,099,690. This second coupler can either be arranged in stationary form or can be rotationally fixedly connected to the shaft. If the second coupler is rotationally fixedly connected to the shaft, it could be formed as a Y light guide connector piece in a further development of the invention to couple the light into the two ends of the light guide coil or to decouple the light from the two ends of the light guide coil and to combine it on a common optical path to the detector.

In an alternative embodiment, the second coupler could also be made coaxially with its end facing the light source, with the inner conductor being optically connected to the one end of the light guide coil and the outer conductor being optically connected to the other end.

The first coupler is advantageously made in a simple manner as a semi-permeable mirror.

The light guide can preferably be made as an optical fiber and particularly favorably as a monomode fiber. A design of the light guide in the form of an integrated optical waveguide is furthermore also possible. In this case, the light-conducting coil is replaced by a ring-shaped waveguide serving as a resonator and having at least one optical input/output coupling piece. The ring-shaped waveguide, couplers and the input/output waveguide can be manufactured by photolithographic processes followed by low-cost planar batch processes such as ion exchange in a glass substrate or the etching of a dielectric film which is disposed on an optical substrate which has a lower refractive index than the dielectric layer. The optical substrate can be quartz glass (fused silica) or also thermally grown silicon on a mechanical substrate made, for example, of monocrystalline silicon.

In an embodiment of the invention of advantageous construction, an adapter piece is provided which is rotationally fixedly connected to the shaft, with the adapter piece serving for the reception of the light guide coil. A light guide coil with a relatively large radius can thus be applied, for example, to a shaft with a small diameter or, generally, the radius of the adapter piece can be matched to the possible bending radius of the light guide. The adapter can furthermore be designed to guide the ends of the light guide coil in a suitable manner toward the end face. The shaft of the electric motor does not then have to have any special design.

The second coupler can furthermore be integrated into the adapter piece.

It would alternatively also be conceivable that the light guide is wound directly onto the shaft without an adapter piece.

Since every rotation of the coil, that is also the rotation of the earth or also the rotation of the total motor housing, generates a corresponding measurement signal, a stationary reference light guide coil is provided in a further development of the invention into which the light of the same laser light source or of a reference laser light source can likewise be coupled for the obtaining of light components running around in opposite senses. These light components are detected in an analog manner superimposed on a reference detector so that the named "outer" rotations can then be detected with the stationary reference light guide coil and the reference detector and are taken into account as correction values by the evaluation unit in the determination of the rotational speed of the motor shaft.

The invention furthermore relates to the use of such a sensor in an electric motor, that is an electric motor having a sensor in accordance with the invention for the determination and regulation of the rotational speed of the electric motor.

Figure 2:
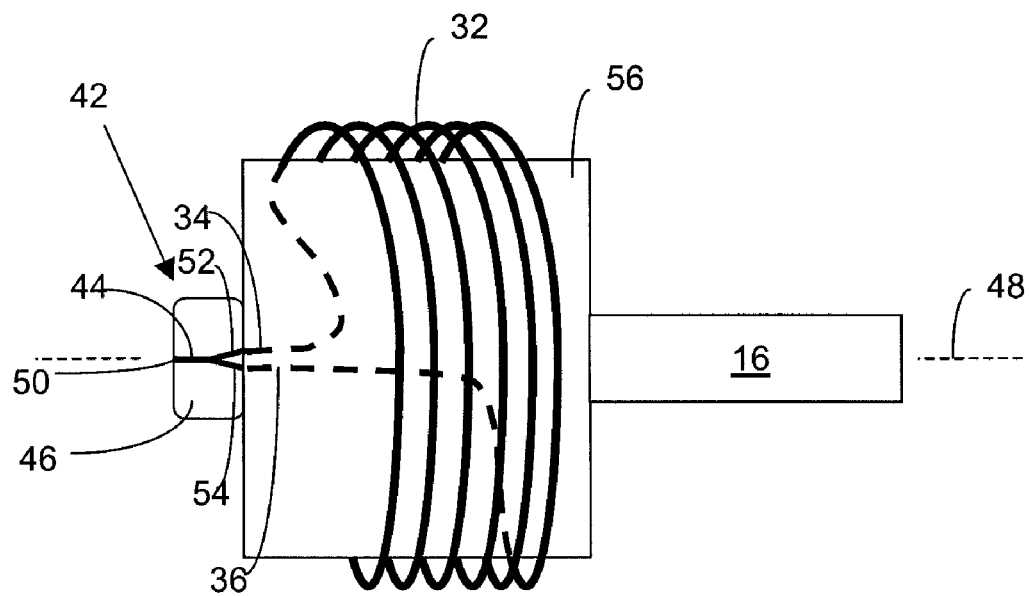
Figure 3:
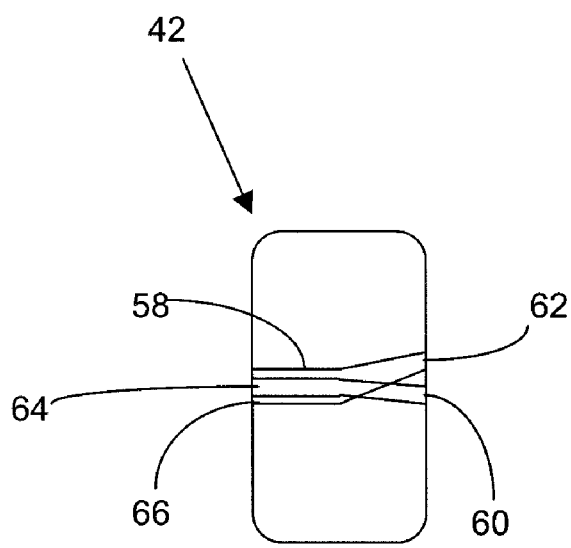
Figure 4:
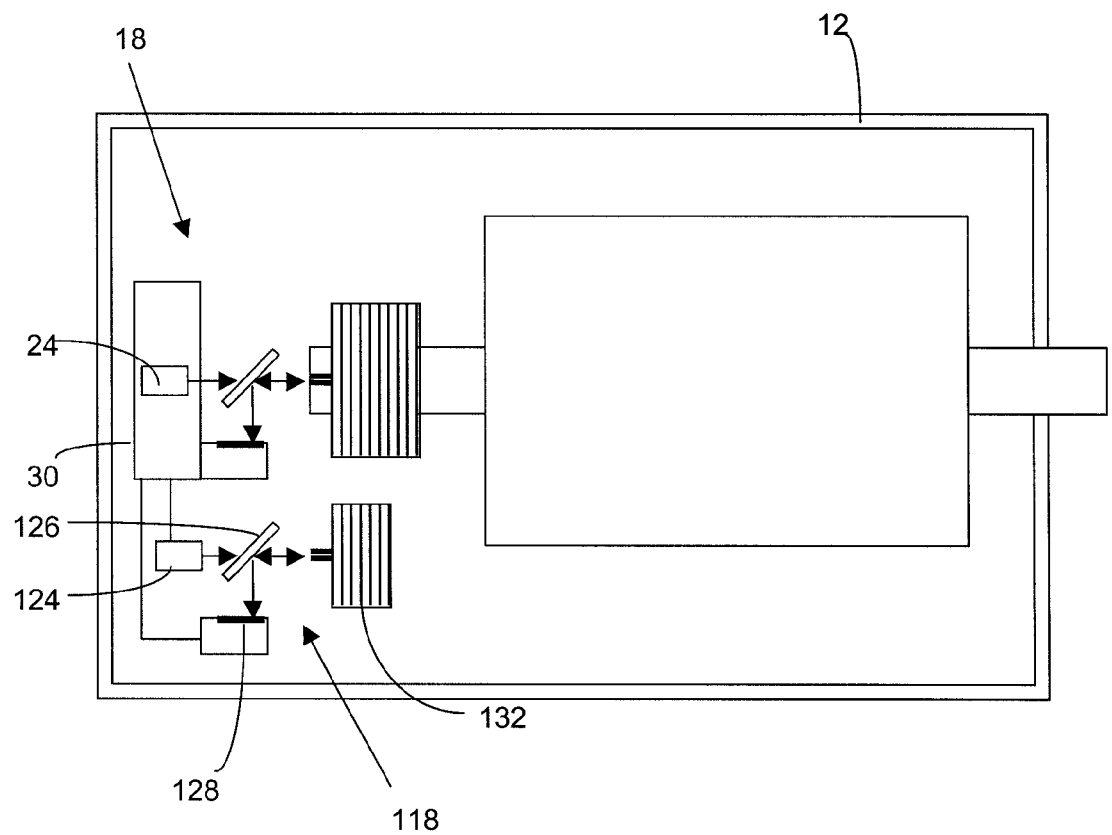

The invention will be described in detail in the following with reference to embodiments and to the drawing. There are shown in the drawing:

FIG. 1 a very schematically simplified representation of an electric motor with a sensor in accordance with the invention;

FIG. 2 a schematic representation of an embodiment of a light guide coil with coupler of the sensor in accordance with the invention;

FIG. 3 a further embodiment of the coupler;

FIG. 4 a representation of FIG. 1 of another embodiment.

An electric motor 10 in accordance with the invention shown in FIG. 1 has a housing 12 as well as a rotor 14 and a rotor shaft 16 driven by the rotor. Electronic details of the electric motor 10 such as the drive and regulation or the like are not shown since they are not relevant to the invention. The invention namely in particular relates to a sensor 18 which is likewise arranged in the housing 12 and with which the rotational speed of the motor shaft 16 can be determined.

The sensor 18 comprises a stationary part 20 and a part 22 co-rotating with the shaft 16. The stationary part 20 includes a laser light source 24, a first optical coupler 26, an optical detector 28 and an evaluation unit 30. The rotating part 22 includes a light guide coil 32 which is rotationally fixedly connected to the shaft 16 and is wound concentrically to the shaft 16. The ends 34 and 36 of the light guide coil 32 are guided centrally toward to the end face 38 of the shaft 16.

The laser light source 24 transmits, in the longitudinal direction of the shaft 16, a light beam 40 which passes through the first optical coupler 26, which is preferably made as a semi-permeable mirror, and is coupled into the two ends 34 and 36 of the light guide coil 31. The light components thus coupled into the ends 34 or 36 run through the light guide coil 32 in opposite directions and exit the light guide coil 32 at the respective other ends 36 and 34 respectively again in the direction toward the semi-permeable mirror 26, that is on the same optical axis as the transmitted light, but in the opposite direction. The two light components are deflected by 90° in the direction of the detector 28 by the semi-permeable mirror 26 in the embodiment shown.

When the motor shaft 16, and thus the light guide coil 32, is stationary, the optical path covered is the same length for both light components so that a specific intensity is measured on the detector 28 on superimposition of the two light components. If, however, the motor shaft 16, and thus the light guide coil 32, rotates, a phase shift occurs between these two light components due to the Sagnac effect in accordance with the formula:

$$\Delta\Phi = \frac{4\pi LR}{\lambda c}\Omega$$

where
ΔΦ phase shift
L length of the light guide in the light guide coil
R radius of the light guide coil
λ light wavelength
c speed of light
Ω angular speed of the light guide coil/shaft 16

This phase shift results in interference dependent on the rotational speed on superimposition of the light components on the detector 28.

The intensity on the detector 28 is transmitted to the evaluation unit 30 via detector signals. The rotational speed of the motor shaft 16 is finally determined from the measured intensity, that is from the detector signals, in the evaluation unit 30. The rotational speed can be used for the rotational speed regulation of the electric motor 12 and/or can be output to the outside.

So that the sensor 18 works in this way, it must be ensured that the transmitted light 40 is coupled into the two ends 34 and 36 of the light guide coil 32 on rotation of the motor shaft 16 in every angular position. For this purpose, a second coupler 42 is preferably provided which can either be arranged in stationary form or is preferably rotationally fixedly connected to the shaft 16. An embodiment of the second coupler 42 is shown in FIG. 2 in which the coupler 42 is made as a Y light guide connector piece 44 which is provided in an assembly body 46 for the rotationally fixed connection to the shaft 16. In this way, the transmitted light 40 can be radiated into the end 50 of the Y light guide connector piece 44 disposed on the axis of rotation 48 and in the direction of the stationary part 20, with it being ensured that the transmitted light 40 is coupled in equal components via the two other ends 52 and 54 of the Y light guide connector piece 44 into the ends 34 and 36 of the light guide coil 32 at every angular position of the motor shaft 16.

To be able to connect the light guide coil 32 to the shaft 16 in a simple manner, the light guide coil 32 is wound onto an adapter piece 56 which can be rotationally fixedly connected to the shaft 16, for example can be plugged onto it. The adapter piece 56 is also advantageous because light guides cannot be bent at any desired angle so that the diameter of the adapter piece 56 can be matched to the possible bending radius of the light guide for the light guide coil 32. This in particular applies when the light guide is preferably made as an optical fiber and particularly preferably as a monomode fiber.

It would also be advantageous if the adapter piece 56 and the second coupler 42 form an integral component.

Further embodiments of the second coupler 42 are conceivable; for example, the second coupler 42 could have a light guide element 58 which is formed coaxially at an end facing the stationary part 20 and has two separate ends 60 and 62 at its other end, with the one end 60 being optically connected to the inner conductor 64 of the coaxial light guide and the other end 62 to the outer conductor of the coaxial line.

In a further development of the invention, in accordance with a further embodiment in accordance with FIG. 4, a reference sensor 118 which has an analog structure to the sensor 18 is provided in addition to the sensor 18. The reference sensor 118 therefore has a reference laser light source 124, a first reference light coupler 126, a reference light guide coil 132 and a reference detector 128. The reference light guide coil 132 is, however, now likewise arranged stationary in the housing 12. The reference sensor 118 can thus detect all revolutions of the total electric motor with housing which are basically also detected by the sensor 18, but cannot be distinguished by the sensor 18 alone from rotations of the shaft 16. In this way, the rotational speed of the shaft 16 can be determined in the evaluation unit 30 while taking account of the reference detector signals so that the rotational speed can be determined more precisely and external rotations can be taken into account, that is eliminated, in this process.

The invention claimed is:

1. A sensor for the determination of the rotational speed of a shaft (16), the sensor having a stationary part (20) and a part (22) co-rotating with the shaft (16), wherein the stationary part (20) has a laser light source (24), a first optical coupler (26), an optical detector (28) and an evaluation unit (30) which determines the rotational speed from the detector signals and the rotating part (22) has a light guide coil (32) which is rotationally fixedly connected to the shaft (16) and is wound concentrically to the shaft (16) with the ends (34 and 36) of the light guide coil (32) being guided to an end face so that, on the one hand, the light (40) of the light source (24) can be coupled into both ends (34 and 36) and two light components run around in opposite directions in the light guide coil (32) and, on the other hand, the light components can be decoupled from the to ends (34 and 36) for the superimposition of the light components on the detector (28) so that, on a rotation of the shaft (16), the detector signals can be detected while exploiting the Sagnac effect from the phase shift of the two light components running around in opposite directions which is dependent on the rotational speed, wherein a stationary reference light guide coil (123) is provided into which light can likewise be coupled for the obtaining of light components running around in opposite senses and these light components can be detected superimposed on a reference detector (128) so that the evaluation unit (30) can determine the rotational speed while taking account of the reference detector signals.

2. A sensor in accordance with claim 1, wherein the light can be coupled into or out of the coil by means of a second coupler (42).

3. A sensor in accordance with claim 2, wherein the second coupler (42) is arranged in a stationary manner.

4. A sensor in accordance with claim 2, wherein the second coupler (42) is rotationally fixedly connected to the shaft.

5. A sensor in accordance with claim 4, wherein the second coupler (42) is made as a Y light guide connector piece (44).

6. A sensor in accordance with claim 4, wherein the second coupler (42) is formed coaxially at its end facing the light source (24) and the inner conductor (64) is optically connected to the one end of the light guide coil (32) and the outer conductor (66) is optically connected to the other end.

7. A sensor in accordance with claim 1, wherein the first coupler (26) is made as a partially optically transmissive mirror.

8. A sensor in accordance with claim 1, wherein the light guide is made as an optical fiber.

9. A sensor in accordance with claim 8, wherein the optical fiber is a monomode fiber.

10. A sensor in accordance with claim 1, wherein the light guide is wound onto an adapter piece (56) which is rotationally fixedly connected to the shaft (16), in particular plugged onto it for the formation of the light guide coil (32).

11. A sensor in accordance with claim 10, wherein the adapter piece (56) includes the second coupler (42).

12. A sensor in accordance with claim 1, wherein the light guide is wound onto the shaft.

13. A sensor in accordance with claim 1, wherein the sensor is part of a rotational speed regulation of an electric motor.

14. An electric motor having a sensor for the determination and regulation of the rotational speed of a shaft (16), the sensor having a stationary part (20) and a part (22) co-rotating with the shaft (16), wherein the stationary part (20) has a laser light source (24), a first optical coupler (26), an optical detector (28) and an evaluation unit (30) which determines the rotational speed from the detector signals and the rotating part (22) has a light guide coil (32) which is rotationally fixedly connected to the shaft (16) and is wound concentrically to the shaft (16) with the ends (34 and 36) of the light guide coil (32) being guided to an end face so that, on the one hand, the light (40) of the light source (24) can be coupled into both ends (34 and 36) and two light components run around in opposite directions in the light guide coil (32) and, on the other hand, the light components can be decoupled from the two ends (34 and 36) for the superimposition of the light components on the detector (28) so that, on a rotation of the shaft (16), the detector signals can be detected while exploiting the Sagnac effect from the phase shift of the two light components running around in opposite directions which is dependent on the rotational speed, the sensor further comprising a stationary reference light guide coil (123) into which light can likewise be coupled for the obtaining of light components running around in opposite senses and these light components can be detected superimposed on a reference detector (128) so that the evaluation unit (30) can determine the rotational speed while taking account of the reference detector signals.

\* \* \* \* \*